US006877762B2

(12) United States Patent
Yamazaki (10) Patent No.: US 6,877,762 B2
(45) Date of Patent: Apr. 12, 2005

(54) STROLLER (75) Inventor: Kojiro Yamazaki, Saitama (JP)

(73) Assignee: Combi Corporation, Tokyo (JP)

( * ) Notice: Subject to any disclaimer, the term of this patent is extended or adjusted under 35 U.S.C. 154(b) by 0 days.

(21) Appl. No.: 10/319,688

(22) Filed: Dec. 16, 2002

(65) Prior Publication Data

US 2003/0116943 A1 Jun. 26, 2003

(30) Foreign Application Priority Data

Dec. 25, 2001 (JP) .................................... 2001-391137

(51) Int. Cl.⁷ ............................................. B62B 7/00
(52) U.S. Cl. ...................... 280/647; 280/642; 280/657
(58) Field of Search .................. 297/239; 280/642, 280/647, 650, 657, 658, 47.25, 47.38, 47.4

(56) References Cited

U.S. PATENT DOCUMENTS

| 4,030,769 A | * | 6/1977 | Peng et al. ................... 280/42 |
| 4,062,555 A | * | 12/1977 | Peng et al. ................... 280/42 |
| 4,077,641 A | * | 3/1978 | Perego ......................... 280/42 |
| 4,386,790 A | * | 6/1983 | Kassai ........................ 280/650 |
| 4,541,916 A | * | 9/1985 | Beuther et al. ............. 208/418 |
| 5,103,530 A | * | 4/1992 | Andrisin et al. ............... 16/20 |
| 5,234,226 A | * | 8/1993 | Liu ............................. 280/642 |
| 5,755,455 A | * | 5/1998 | Chen et al. ................. 280/642 |
| 6,042,195 A | * | 3/2000 | Huang .................... 301/111.06 |
| 6,048,037 A | * | 4/2000 | Cheng .................... 301/111.06 |
| 6,152,539 A | * | 11/2000 | Hu ......................... 301/111.06 |
| 6,367,826 B1 | * | 4/2002 | Klais ..................... 280/86.751 |
| 6,386,575 B1 | * | 5/2002 | Turner ........................ 280/647 |
| 6,428,034 B1 | * | 8/2002 | Bost ........................... 280/650 |
| 6,446,990 B1 | * | 9/2002 | Nania et al. ........... 280/47.371 |
| 6,575,492 B2 | * | 6/2003 | Davidson .................... 280/647 |

\* cited by examiner

Primary Examiner—Christopher P. Ellis
Assistant Examiner—Kelly E Campbell
(74) Attorney, Agent, or Firm—Wenderoth, Lind & Ponack, L.L.P.

(57) ABSTRACT

A stroller comprises a handle having a shape resembling the inverted letter U, armrests pivotally joined to the handle, front legs pivotally joined to the armrests, respectively, rear legs pivotally joined to the armrests, respectively, front wheels held on lower end parts of the front legs, respectively, and rear wheels held on lower end parts of the rear legs, respectively. The front legs are set so as to extend obliquely away from each other toward the front wheels. The rear legs are set so as to extend obliquely away from each other toward the rear wheels.

20 Claims, 7 Drawing Sheets

STROLLER

TECHNICAL FIELD

The present invention relates to a highly rigid and foldable stroller.

BACKGROUND ART

There have been proposed various folding strollers for carrying a baby outdoors for walking or shopping, capable of being folded to facilitate storing and carrying thereof.

In a conventional stroller, a plane including a front leg holding a wheel or a caster on its lower end and a rear leg holding a wheel or a caster on its lower end is vertical to the ground as viewed in a front elevational view. Consequently, the stroller has low rigidity to withstand a transverse force and hence the stroller is unable to move stably. A folding stroller capable of being folded in three so as to reduce its width, in particular, has low rigidity because the folding stroller has many pivotal joints. If rigidity of a body of the folding stroller is increased, weight of the folding stroller increases unavoidably, the folding stroller requires many folding operations, and the stroller becomes inconvenient to use.

SUMMARY OF THE INVENTION

The present invention has been made in view of such problems and it is therefore an object of the present invention to provide a stroller having high rigidity and capable of being fold ed by performing simple folding operations.

According to the present invention, a stroller comprises: a U-shaped handle; armrests pivotally joined to the handle; front legs pivotally joined to the armrests, respectively; rear legs pivotally joined to the armrests, respectively; front wheels held on lower end parts of the front legs, respectively; and rear wheels held on lower end parts of the rear legs, respectively; therein the front legs are set so as to extend obliquely away from each other toward the front wheels, and the rear legs are set so as to extend obliquely away from each other toward the rear wheels.

The stroller according to the present invention is characterized in that the front legs are connected by an x-shaped linkage.

The stroller according to the present invention is characterized in that the x-shaped linkage is connected to the front legs and lower end parts of the handle.

The stroller according to the present invention is characterized in that the x-shaped linkage is extended obliquely downwardly from the front legs toward the lower end parts of the handle.

The stroller according to the present invention is characterized in that the front legs and the handle are connected by connecting bars, and the front legs are connected through the connecting bars to the x-shaped linkage.

The stroller according to the present invention is characterized in that the connecting bars are connected by an intermediate stay, the front legs are connected by a footrest, and the intermediate stay and the footrest have bendable middle parts, respectively.

The stroller according to the present invention is characterized in that the connecting bars are connected to the footrest by connecting rods.

The stroller according to the present invention is characterized in that each of the front wheels is supported by a corresponding front leg through a swivel structure capable of turning relative to the front wheel.

The stroller according to the present invention is characterized in that the front heels are of double-wheel construction.

The stroller according to the present invention is characterized in that an axle-holding member is mounted on an axle of each front wheel, and the swivel structure is capable of turning on the axle-holding member.

The stroller according to the present invention is characterized in that each swivel structure has a support part extending perpendicularly to an axis of the front wheel in a moving direction, and a connecting part that turns on an arm part.

DETAILED DESCRIPTION OF THE PREFERRED EMBODIMENTS

Preferred embodiments of the present invention will be described with reference to the accompanying drawings.

Figure 1:
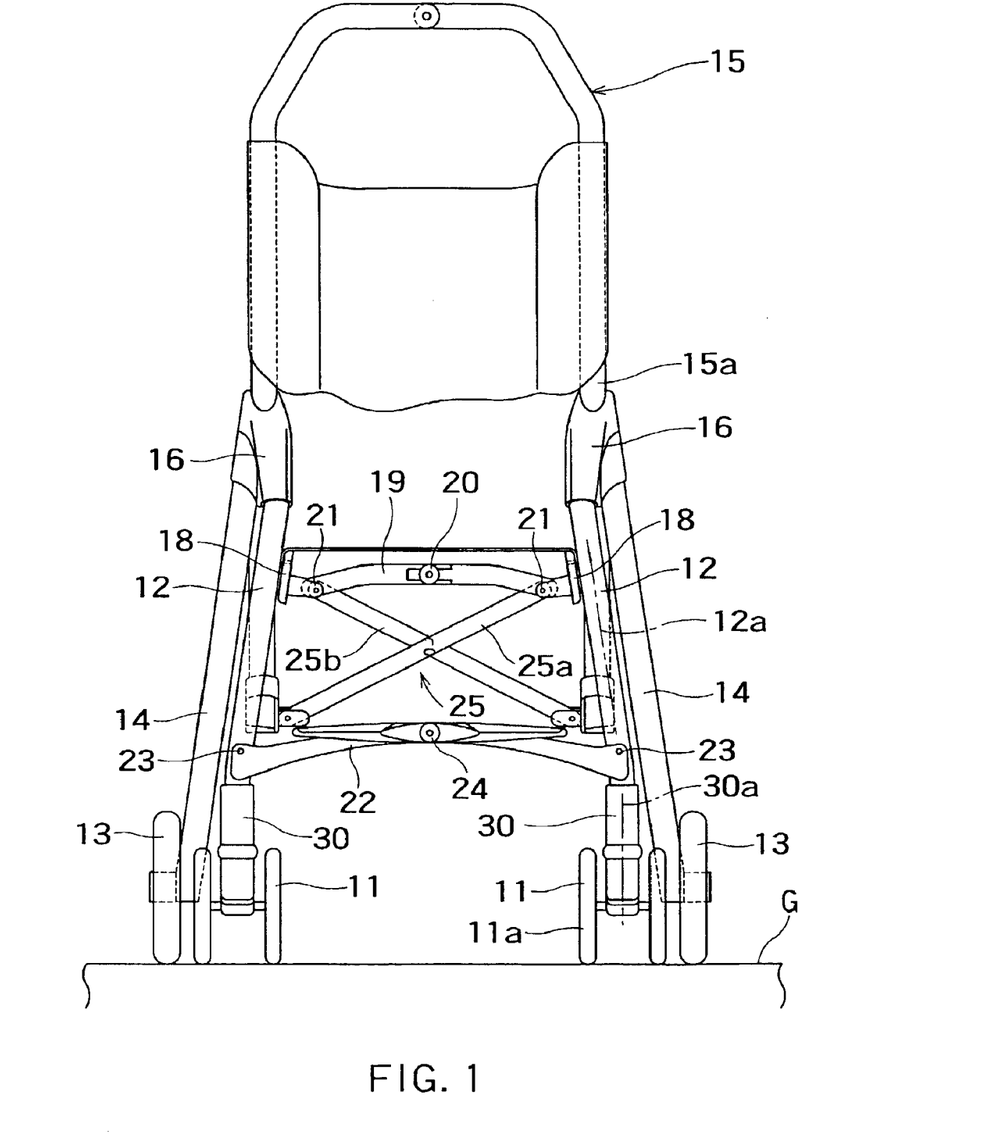
FIG. 1 is a front elevational view of a stroller in a preferred embodiment according to the present invention in an unfolded state.
Figure 2:
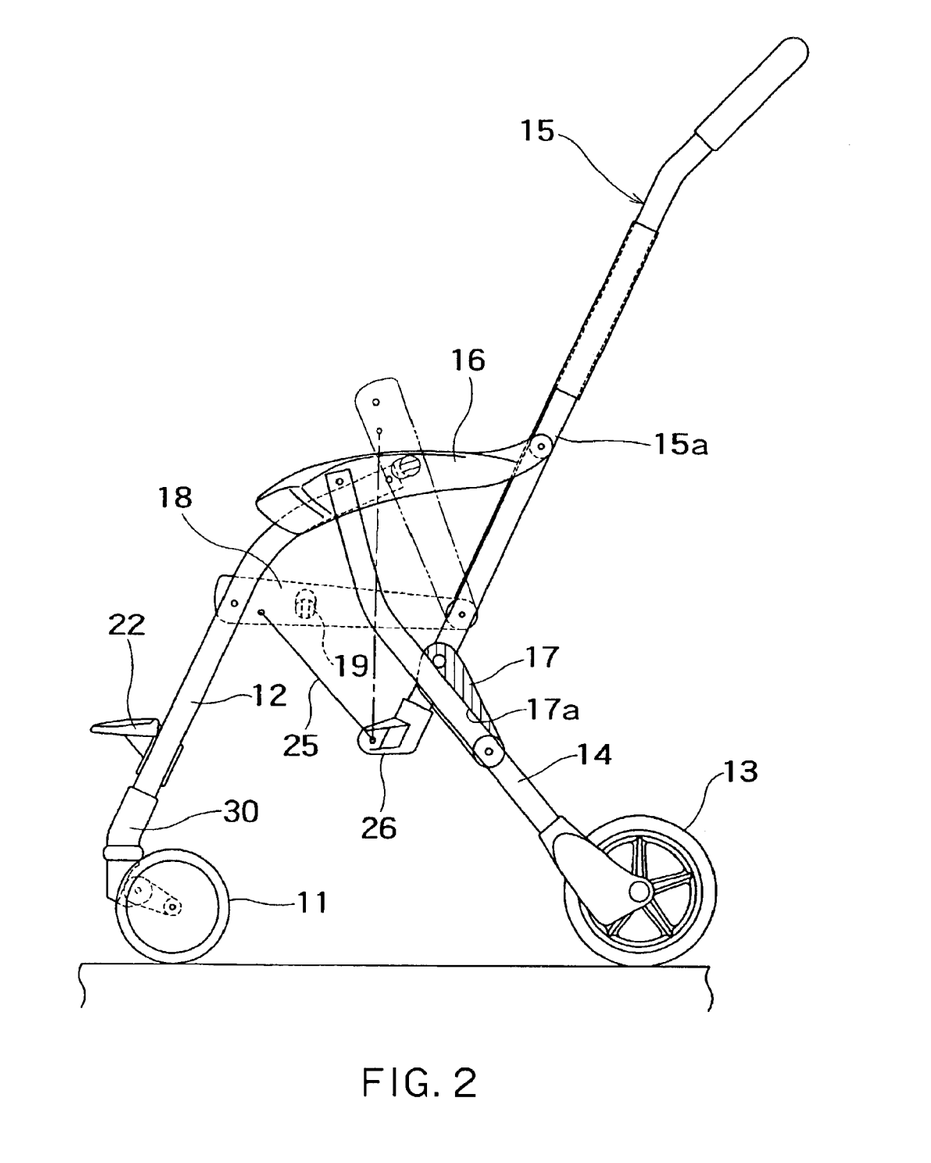
FIG. 2 is a side elevational view of the stroller of the present invention in an unfolded state.

FIGS. 1 and 2 are a front elevational view and a side elevational view, respectively, of a stroller in a preferred embodiment according to the present invention. The stroller has right and left front legs 12 each provided with a front wheel 11 of double-wheel construction including a pair of wheels 11a, a pair of rear legs 14, each provided with a rear wheel 13, a handle of a shape substantially resembling an inverted letter U having right and left side legs 15a, right and left armrests 16, and a guard arm, not shown, extended between the armrests 16 and detachably joined to the armrests 16.

The armrests 16 have rear end parts pivotally joined to the right and the left side legs 15a of the handle 15, respectively. Upper ends of the front legs 12 are pivotally joined to middle parts of the right and the left armrest 16, respectively. The rear legs 14 have upper end parts extended across upper end parts of the front legs 12, and have upper ends pivotally joined to parts of the armrests 16 on a front side of parts of the armrests 16 to which the upper ends of the front legs 12 are pivotally joined. As best shown in FIG. 1, the right and left front legs 12 are set so as to extend obliquely away from each other toward the front wheels 11 such that a distance between lower parts of the front legs 12 is greater than that between upper parts of the same as viewed from a front of the stroller. Similarly, the rear legs 14 are set so as to extend obliquely away from each other toward the rear wheels 13.

Upper ends of the rear legs 14 are pivotally joined to parts of the armrests 16 on a front side of the parts of the armrests 16 to which the upper ends of the front legs 12 are pivotally joined in this embodiment. However, the upper ends of the rear legs 14 may be pivotally joined to parts of the armrests 16 on a rear side of the parts to which the upper ends of the front legs 12 are pivotally joined, or the upper ends of the front legs 12 and those of the rear legs 14 may be coaxially pivotally joined to the armrests 16.

Each of brackets 17 has one end joined pivotally to a part of a corresponding side leg 15a of the handle 15 near a lower end of the side leg 15a and another end pivotally joined to a middle part of a corresponding rear leg 14. When the stroller is in an unfolded state as shown in FIG. 2, the rear legs 14 engage in longitudinal grooves 17a of the brackets 17, respectively, so that the rear legs 14 are held firmly in place.

Each of right and left connecting bars 18 has a front end pivotally joined to a corresponding front leg 12 and another end pivotally joined to a corresponding side leg 15a of the handle 15. An intermediate stay 19 has opposite ends connected to the right and left connecting bars 18, respectively. The intermediate stay 19 is provided in its middle part with a hinge 20 that allows the intermediate stay 19 to be bent so that parts of the intermediate stay 19 on opposite sides of the hinge 20 extend upwardly. Opposite ends of the intermediate stay 19 are pivotally joined to the connecting bars 18 with pins 21, respectively. The footrest 22 has opposite ends pivotally joined to the right and left front legs 12 with pins 23, respectively. A footrest 22 is provided in its middle part with a hinge 24 that allows the footrest 20 to be bent so that parts of the footrest 20 on opposite sides of the hinge 24 extend upwardly.

The front legs 12 and the handle 15 are connected by an x-shaped linkage 25 that slopes downwardly toward a rear of the stroller when the stroller is unfolded. The x-shaped linkage 25 has two links 25a and 25b extending across each other and having pivotally joined substantially middle parts. Lower ends of the links 25a and 25b are pivotally joined to connecting members 26 joined to lower ends of the side legs 15a of the handle 15.

A flexible member or a pivotal joint is inserted into a middle part of a horizontal part of the handle 15 to allow the horizontal part to bend to some extent.

Figure 3:
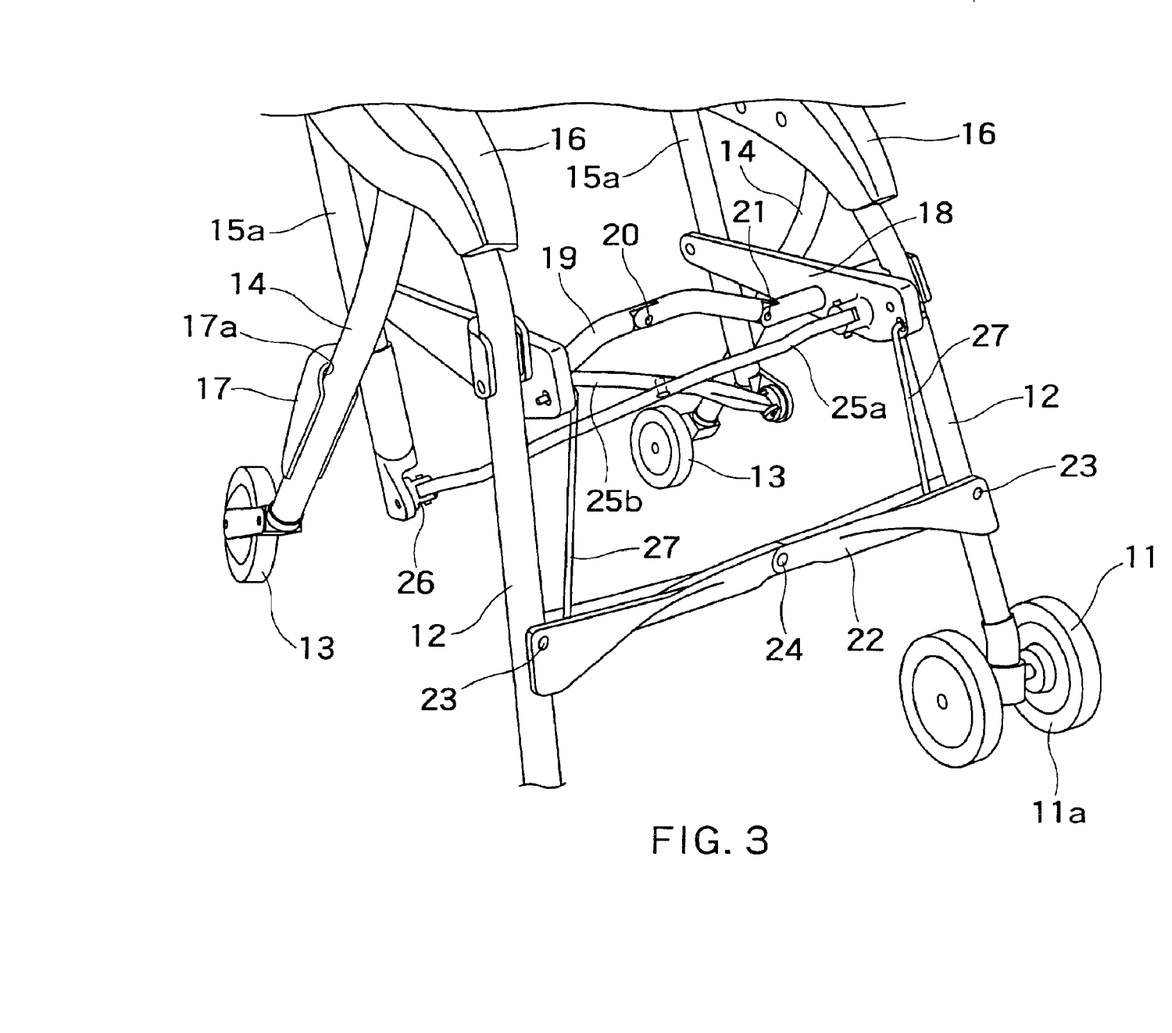
FIG. 3 is a fragmentary perspective view of the stroller of the present invention in an unfolded state.

FIG. 3 shows the connecting bars 18, the intermediate stay 19, the footrest 22 and the x-shaped linkage 25 in a perspective view. Parts near opposite ends of the footrest 22 are connected to front ends of the connecting bars 18 by connecting rods 27, respectively.

Figure 4:
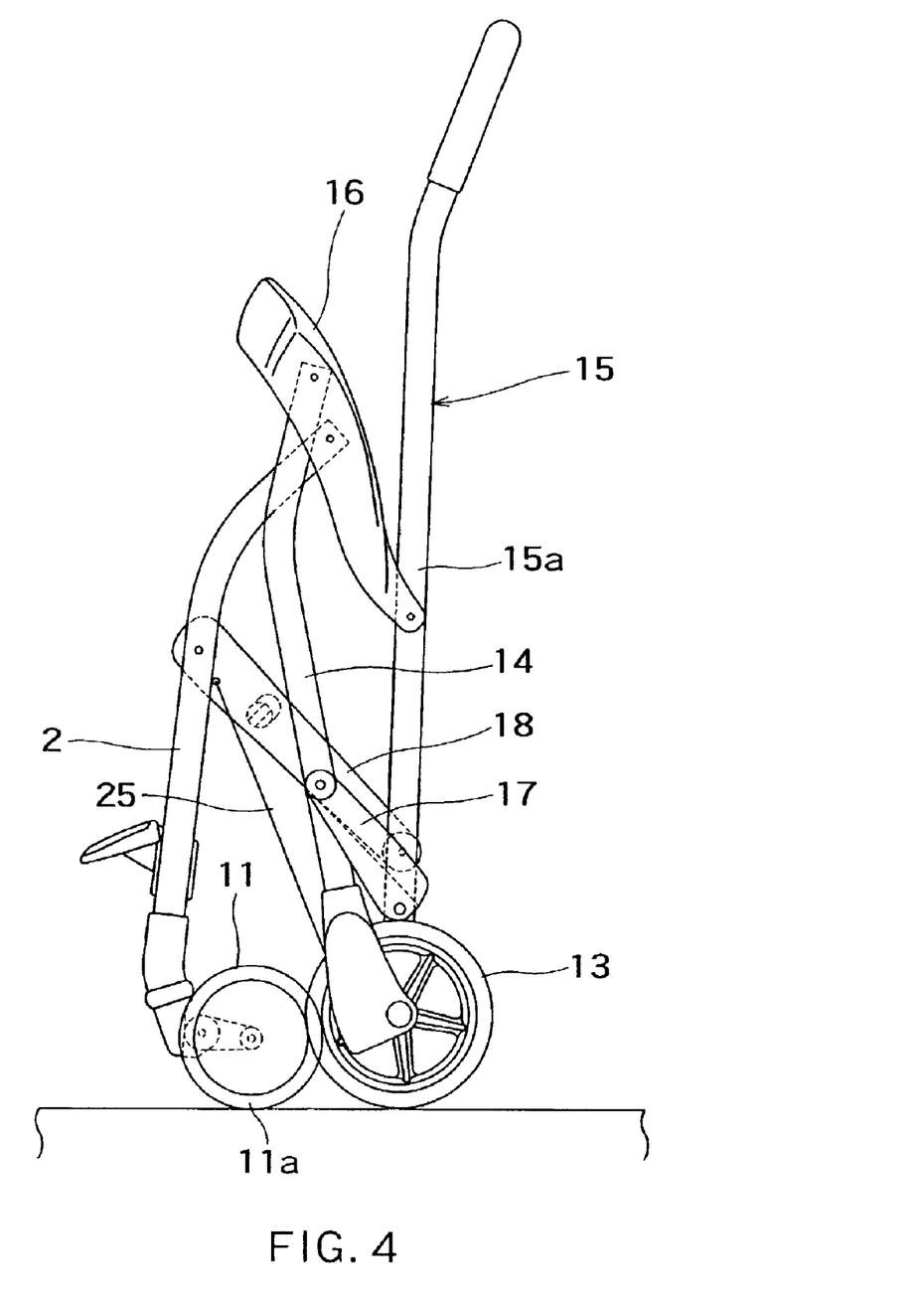
FIG. 4 is a side elevational view of the stroller of the present invention in a folded state.
Figure 5:
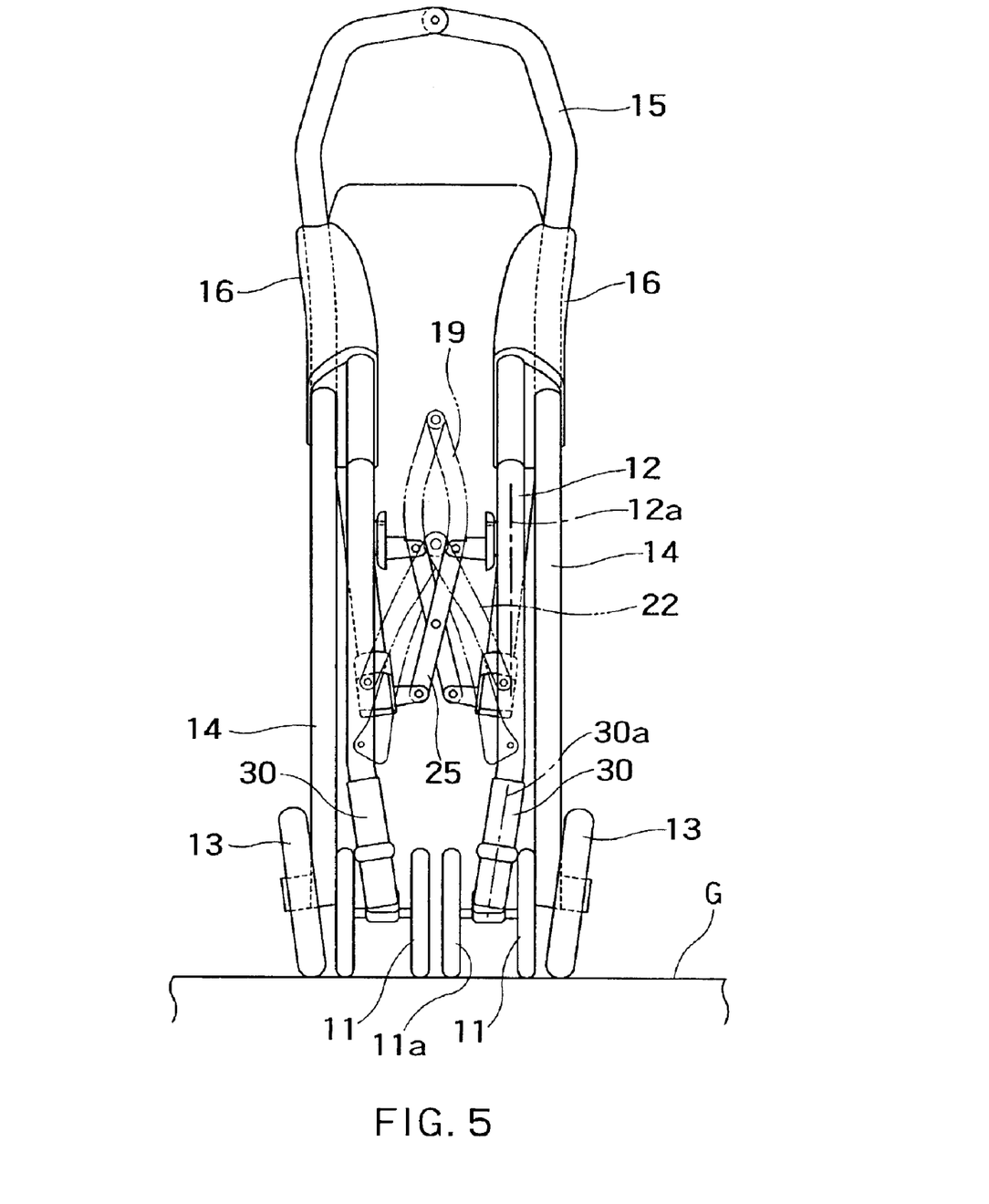
FIG. 5 is a front elevational view of the stroller of the present invention in a folded state.

When the handle 15 is pulled rearwardly and pushed down to fold the stroller, when in the unfolded state shown in FIG. 2, the brackets 17 turn clockwise, as viewed in FIG. 2, on joints pivotally joining the brackets 17 to the handle 15, and the handle 15 moves downwardly relative to the rear legs 14. Consequently, the armrests 16 and the connecting bars 18 are turned upwardly on joints pivotally joining the armrests 16 and the connecting bars 18 to the handle 15, the rear wheels 13 approach the front wheels 11, and a size of the stroller in a direction from the front to the rear thereof is reduced as shown in FIG. 4. As the connecting bars 18 are thus turned, the x-shaped linkage 25 contracts so that a width thereof decreases. Consequently, the front legs 12, the side legs 15a of the handle 15, and the rear legs 14 approach each other, respectively, so that a lateral size of the stroller is reduced. As the x-shaped linkage 25 contracts, the intermediate stay 19 bends upwardly convexly. Then, the footrest 22 is pulled upwardly by the connecting rods 27. As the front legs 12 approach each other, the footrest 22 is bent upwardly convexly. Thus, the legs can be made to approach each other without hindrance. FIGS. 4 and 5 are a side elevational view and a front elevational view, respectively, of a folded stroller.

The handle 15 is raised and the horizontal part of the handle 15 is pulled rearwardly to unfold the folded stroller. In this case, the right and the left legs 12, 14 move away from each other, and the front wheels 11 and the rear wheels 13 move away from each other to positions shown in FIG. 2. In the state shown in FIG. 2, the rear legs 14 are engaged in the grooves 17a of the brackets 17 to fix the rear legs 14 relative to the handle 15.

Since the front legs 12 extend obliquely away from each other toward the front wheels 11, and the rear legs 14 also extend obliquely away from each other toward the rear wheels 13 as viewed from the front of the stroller, transverse forces that push the right and the left legs 12, 14 away from each other, act on the right and the left legs 12, 14 when the stroller is loaded. Therefore, tensile forces act on the intermediate stay 19, the footrest 22 and the x-shaped linkage 25, so that framing of the stroller can be stable and the stroller is able to smoothly move. The intermediate stay 19 and the x-shaped linkage 25 connecting the right and the left legs 12, 14 bear transverse and vertical forces and strengthen the framing of the stroller.

The stroller needs only to be tilted and depressed in order to fold the stroller, the stroller can be folded by a series of operations while holding the stroller with hands, and any complicated operating member does not need to be incorporated into the handle 15.

Although the footrest 22 is urged in a folding direction by the connecting rods 27 in this embodiment, the footrest 22 may be continuously urged in the folding direction by a spring or the like.

As mentioned above, the front legs 12 are set so as to extend obliquely away from each other toward the front wheels 11, and the rear legs 14 are set so as to extend obliquely away from each other toward the rear wheels 13 in the stroller of the present invention. Therefore, it appears that the wheels 11a of the front wheels 11 are tilted with respect to ground G and the wheels 11a are unable to roll along the ground when the stroller is folded, when the front wheels 11 are held such that the wheels 11a are perpendicular to the ground while the stroller is being unfolded as shown in FIG. 1. To avoid such a problem, axles 31 supporting the wheels 11a are supported so as to be tiltable relative to the legs 12, and are pressed downwardly by springs or the like, respectively, so that the wheels 11a are always perpendicular to the ground G.

A swivel structure 30 holding a respective front wheel 11 is attached to the lower end of a respective front leg 12. Axis 30a is inclined relative to axis 12a of the front leg 12 such that a plane including the axis 30a of the swivel structure 30 is perpendicular to the ground G when the stroller is unfolded for use as shown in FIG. 1. The plane including the axis 30a of the swivel structure 30 is tilted relative to the ground G when the stroller is folded as shown in FIG. 5.

Figure 6A:
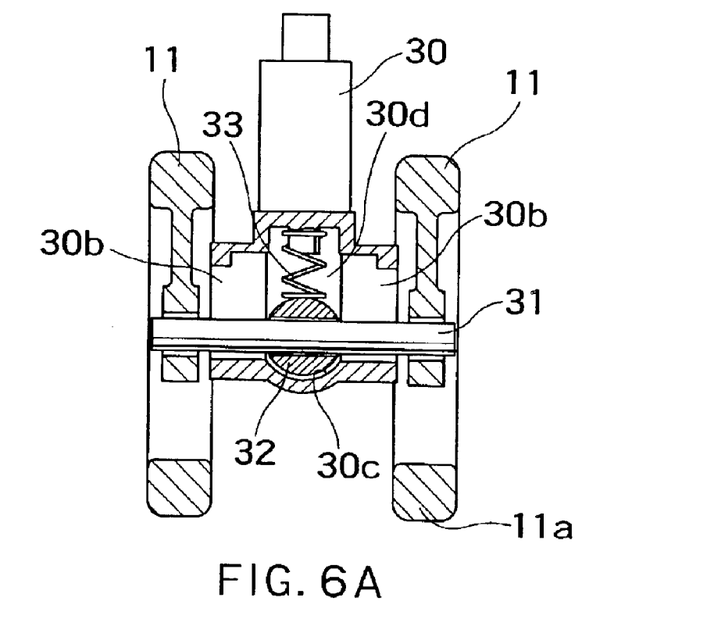
FIG. 6A is a sectional view of a front wheel support mechanism for supporting a front wheel on a front leg of the stroller of the present invention in a state where the stroller is unfolded.
Figure 6B:
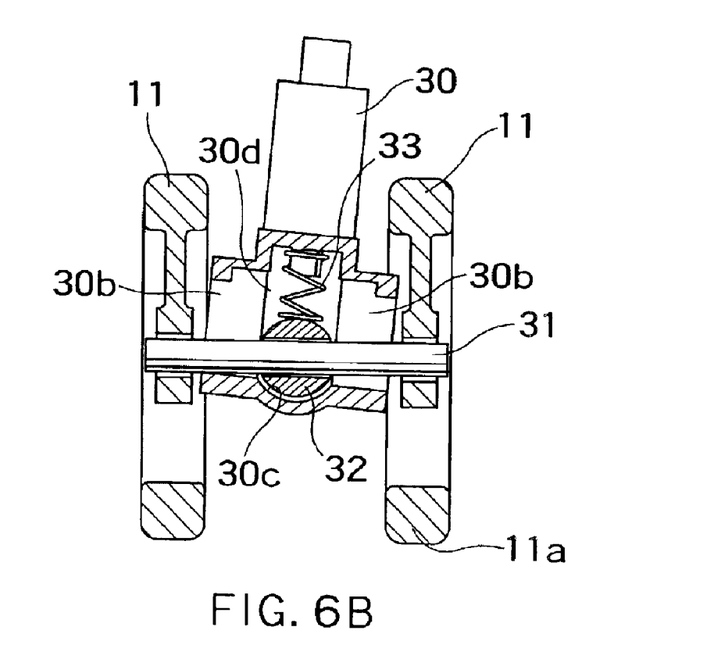
FIG. 6B is a sectional view of a front wheel support mechanism for supporting the front wheel on the front leg in a state where the stroller is folded.

FIGS. 6A and 6B show a wheel holding mechanism included in the front wheel 11. The axle 31 is extended through the swivel structure 30 attached to the lower end of the front leg 12, and wheels 11a are supported for rotation on opposite end parts of the axle 31, respectively. An axle holding member 32 fixedly mounted on the axle 31 is placed in a cavity 30d formed in the swivel structure 30. Vertical slots 30b are formed in opposite side walls of the swivel structure 30. The axle-holding member 32 has a substantially circular shape in a cross section taken in a vertical plane including an axis of the axle 31. The axle holding member 32 is seated on a surface of a circular recess 30c formed in a bottom surface of the cavity 30d of the swivel structure 30 and is pressed against the surface of the recess 30c by a spring 33. Opposite end parts of the axle 31 project outside from the swivel body 30 through the slots 30b, and the wheels 11a of the front wheel 11 are supported for rotation on the opposite end parts of the axle 31, respectively.

As shown in FIGS. 1 and 6A, the axis of the axle 31 is perpendicular to the axis of the swivel body 30 when the stroller is unfolded, and right and left front wheels 11 are perpendicular to the ground. As shown in FIG. 5, the axis 30a of the swivel body 30 is tilted relative to the ground G when the stroller is folded. However, the axle 31 moves vertically along the slots 30b of the swivel structure 30 and, eventually, the wheels 11a of each front wheel 11 lie perpendicularly to the ground. Thus, the wheels 11a of the right and the left front wheels 11 are always perpendicular to the ground G and the front wheels 11 are able to roll smoothly either when the stroller is unfolded or folded.

The front wheels 11 are accurately fabricated because the front wheels 11 are of double-wheel construction provided with the pair of wheels 11a, and the wheels 11a are always in contact with the ground. Thus, errors introduced into the stroller during manufacture thereof can be corrected and quality of the stroller can be improved.

Figure 7A:
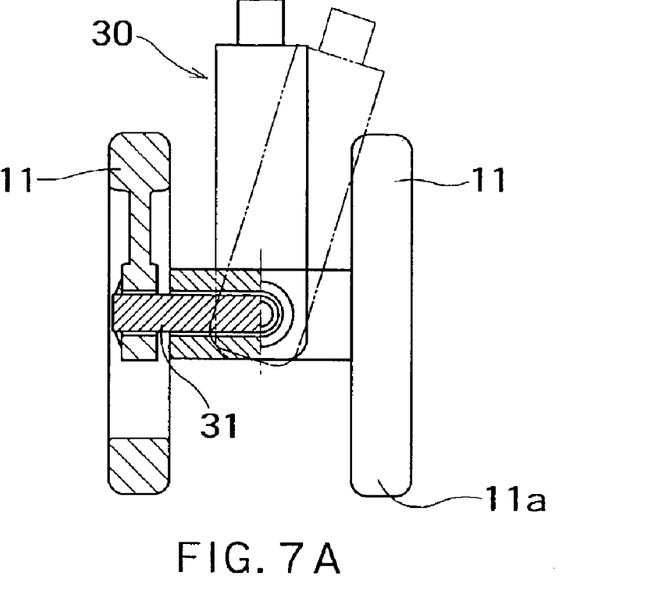
FIG. 7A is a partly longitudinal sectional front elevational view of another front wheel support mechanism for supporting the front wheel on the front leg.
Figure 7B:
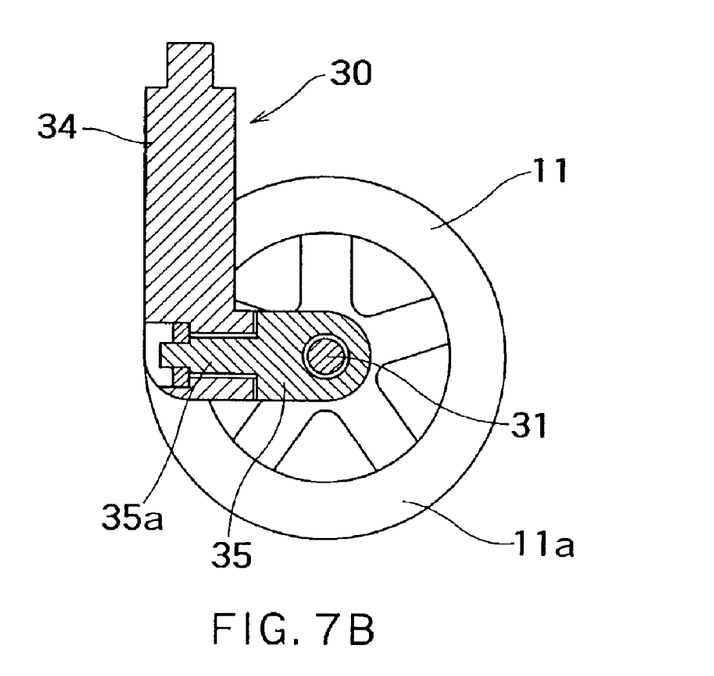
FIG. 7B is a partly longitudinal sectional side elevational view of the front wheel support mechanism shown in FIG. 7A.

FIGS. 7A and 7B show a swivel structure in a modification. As shown in FIGS. 7A and 7B, a swivel structure 30 has a connecting part 34 to be connected to front leg 12, and an axle support part 35 supporting axle 31. The swivel structure 30 has a shape substantially resembling the letter L. The axle support part 35 is integrally provided with an arm 35a. The arm 35a projects forwardly perpendicularly to an axis of the axle 31. A lower end part of the connecting part 34 is joined to the arm 35a for turning about an axis of the arm 35a. An upper end part of the connecting part 34 is connected to the front leg 12 so as to be turnable on the axle 31.

When the stroller is unfolded, the connecting part 34 extends substantially vertically as indicated by continuous lines in FIG. 7A, and front wheel 11 is perpendicular to the ground as shown in FIG. 7A. When the stroller is folded, the connecting part 34 tilts as indicated by two-dot chain lines in FIG. 7A. In this case, the axle support part 35 turns relative to the connecting part 34 when the front wheel 11 is set on ground G such that wheels 11a of the front wheel 11 are set on the ground G perpendicularly to the ground G. Thus, the wheels 11a of both right and left front wheels 11 are always perpendicular to the ground G and the front wheels 11 are able to roll smoothly either when the stroller is unfolded or folded. Since the wheels 11a of the front wheel 11 of double-wheel construction are always in contact with the ground G, errors introduced into the stroller during manufacture thereof can be corrected and quality of the stroller can be improved.

As is apparent from the foregoing description, according to the present invention, the front legs are set so as to extend obliquely away from each other toward the front wheels, and the rear legs are set so as to extend obliquely away from each other toward the rear wheels as viewed from the front of the stroller. Therefore, transverse forces that push the right and the left legs away from each other, act on the right and the left legs when the stroller is loaded. Consequently, tensile forces act on the intermediate stay, the footrest and the x-shaped linkage, so that the framing of the stroller is highly rigid. Since the right and the left front legs are connected by the x-shaped linkage, the width of the stroller can be reduced by folding the framing of the stroller in two, the stroller can be folded or unfolded by a series of operations while holding the stroller with hands, and any complicated operating member does not need to be incorporated into the handle.

What is claimed is:

1. A stroller comprising:
    a U-shaped handle having a horizontal part including a pivotal joint at a middle portion thereof;
    armrests pivotally joined to said U-shaped handle;
    front legs pivotally joined to said armrests, respectively;
    rear legs pivotally joined to said armrests, respectively;
    front wheels on lower end parts of said front legs, respectively; and
    rear wheels on lower end parts of said rear legs, respectively;
    wherein said front legs are set so as to extend obliquely away from each other toward said front wheels, and said rear legs are set so as to extend obliquely away from each other toward said rear wheels, and
    wherein each of said front wheels is supported by a corresponding one of said front legs via a swivel structure capable of turning relative to said each of said front wheels,
    such that when the stroller is unfolded and said horizontal part is bent at said pivotal joint, said front legs and rear legs are perpendicular to a ground surface, and said front wheels are also perpendicular to the ground surface via said swivel structures turning relative to said front wheels, respectively.

2. The stroller according to claim 1, wherein
    said front legs are interconnected by an x-shaped linkage.

3. The stroller according to claim 2, wherein
    said x-shaped linkage is connected to said front legs and lower end parts of said U-shaped handle.

4. The stroller according to claim 3, wherein
    said x-shaped linkage is extended obliquely downwardly from said front legs toward said lower end parts of said U-shaped handle.

5. The stroller according to claim 2, wherein
    said front legs and said U-shaped handle are interconnected by connecting bars, and said front legs are connected via said connecting bars to said x-shaped linkage.

6. The stroller according to claim 5, wherein
    said connecting bars are interconnected by an intermediate stay, said front legs are interconnected by a footrest, and said intermediate stay and said footrest have bendable middle portions, respectively.

7. The stroller according to claim 5, wherein
    said connecting bars are connected to said footrest by connecting rods.

8. The stroller according to claim 1, wherein
said front wheels are of double-wheel construction.

9. The stroller according to claim 1, further comprising:
an axle holding member mounted on an axle included in each of said front wheels, wherein each said swivel structure is capable of turning on a corresponding said axle holding member relative to a corresponding one of said each of said front wheels.

10. The stroller according to claim 1, wherein
each said swivel structure has a support part extending perpendicularly to an axis of a corresponding one of said front wheels in a moving direction, and a connecting part that turns on an arm part of said support part such that said each said swivel structure turns relative to said corresponding one of said front wheels by said connecting part turning on said arm part.

11. The stroller according to claim 1, wherein
each of said front wheels is rotatable about an axis, and
each said swivel structure is capable of turning relative to a corresponding one of said each of said front wheels by being capable of turning about an axis that is perpendicular to the axis about which said corresponding one of said each of said front wheels is rotatable, and is also generally parallel to the ground surface.

12. The stroller according to claim 11, wherein
said front legs are interconnected by an x-shaped linkage.

13. The stroller according to claim 12, wherein
said x-shaped linkage is connected to said front legs and lower end parts of said U-shaped handle.

14. The stroller according to claim 13, wherein
said x-shaped linkage is extended obliquely downwardly from said front legs toward said lower end parts of said U-shaped handle.

15. The stroller according to claim 12, wherein
said front legs and said U-shaped handle are interconnected by connecting bars, and said front legs are connected via said connecting bars to said x-shaped linkage.

16. The stroller according to claim 15, wherein
said connecting bars are interconnected by an intermediate stay, said front legs are interconnected by a footrest, and said intermediate stay and said footrest have bendable middle portions, respectively.

17. The stroller according to claim 15, wherein
said connecting bars are connected to said footrest by connecting rods.

18. The stroller according to claim 11, wherein
said front wheels are of double-wheel construction.

19. The stroller according to claim 11, further comprising:
an axle holding member mounted on an axle included in each of said front wheels, wherein each said swivel structure is capable of turning on a corresponding said axle holding member about the axis that is perpendicular to the axis about which said corresponding one of said each of said front wheels is rotatable, and also generally parallel to the ground surface.

20. The stroller according to claim 11, wherein
each said swivel structure has a support part extending perpendicularly to an axis of a corresponding one of said front wheels in a moving direction, and a connecting part that turns on an arm part of said support part such that said each said swivel structure is capable of turning on a corresponding said axle holding member about the axis that is perpendicular to the axis about which said corresponding one of said each of said front wheels is rotatable, and also generally parallel to the ground surface, by said connecting part turning on said arm part.

* * * * *